United States Patent [19]

Neidigh

[11] Patent Number: 4,827,836

[45] Date of Patent: May 9, 1989

[54] FRUIT AND VEGETABLE PEELER

[75] Inventor: Ronnie C. Neidigh, Sparks, Nev.

[73] Assignee: Filper Industries, Inc., Reno, Nev.

[21] Appl. No.: 233,837

[22] Filed: Aug. 16, 1988

Related U.S. Application Data

[63] Continuation of Ser. No. 110,934, Oct. 20, 1987, which is a continuation of Ser. No. 863,335, May 15, 1986, abandoned.

[51] Int. Cl.$^4$ ............................................. A23N 7/02
[52] U.S. Cl. ....................................... 99/625; 15/3.2; 99/626; 99/628; 99/629
[58] Field of Search ................. 99/518, 519, 623–626, 99/629, 630, 628; 15/3.2, 3.19

[56] References Cited

U.S. PATENT DOCUMENTS 3,566,942 3/1971 Smith ..................................... 99/625
4,237,782 12/1980 Bichel ..................................... 99/625

Primary Examiner—Timothy F. Simone
Attorney, Agent, or Firm—Gerald L. Moore; Robert Charles Hill; John A. Bucher

[57] ABSTRACT

In a produce peeler a plurality of rolls (14) are mounted in a "U" configuration around an auger (26) and are individually rotated by hydraulic drive motors (16) to peel produce passing through. The rolls are positioned in a hyperbolic configuration to enhance the produce tumbling and thereby improve the peeling action. The rolls are also interchangeable with separate speed controls for each.

5 Claims, 2 Drawing Sheets

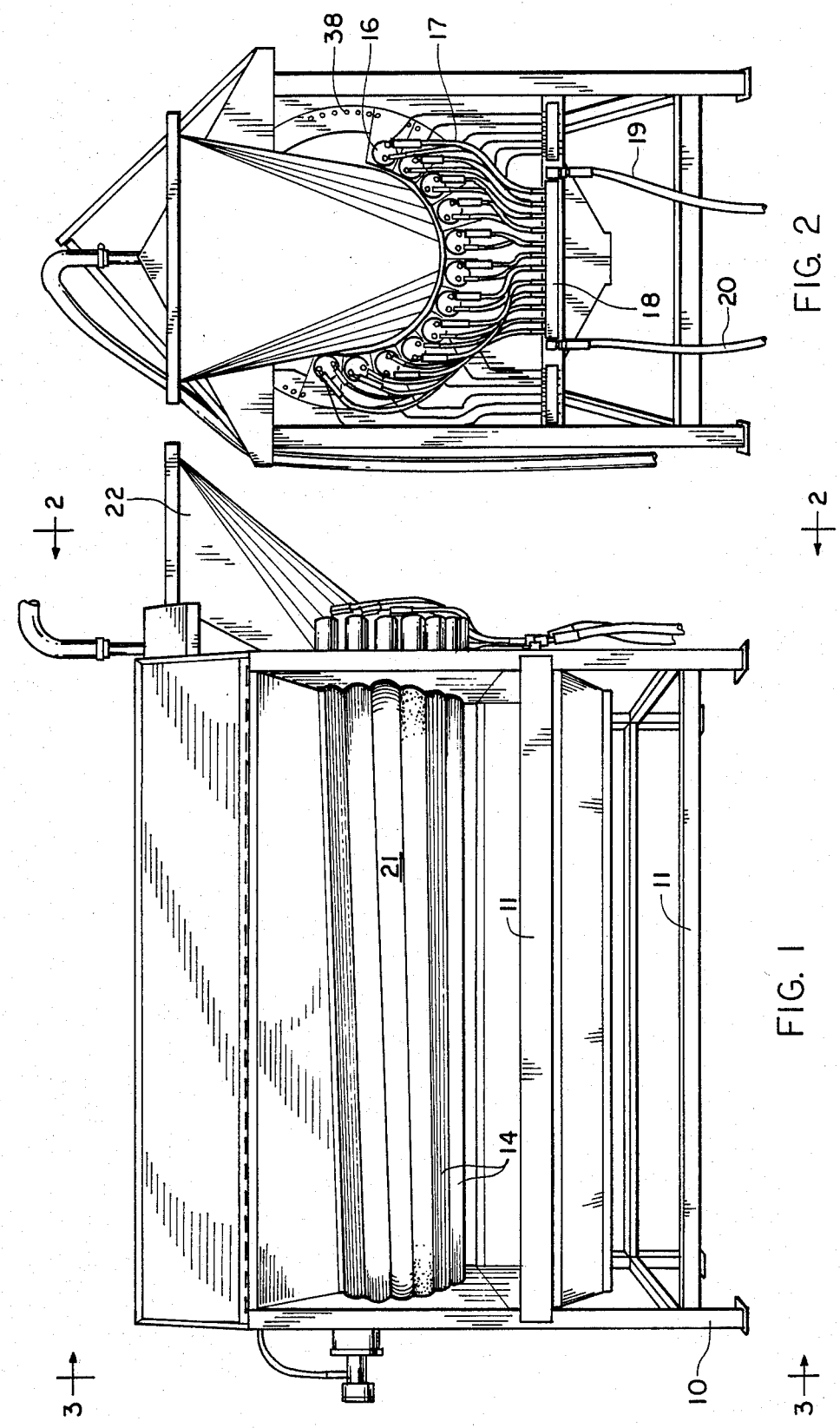

ces the chance of flat spots and shape distortions even
FRUIT AND VEGETABLE PEELER This is a continuation of co-pending application Ser. No. 110,934, filed on Oct. 20, 1987, which is a continuation of application Ser. No. 863,335, filed on May 15, 1986, now abandoned.

FIELD OF THE INVENTION

A peeler having a plurality of rollers forming the walls of a trough with each roll having a surface suitable for removing peel and being rotated to tumble and move the product along the trough. A power driven auger is center-mounted for moving the product along the trough at a controlled rate.

BACKGROUND OF THE INVENTION

A. Related Patents:

The subject peeler is of the general type shown in the U.S. Pat. No. 3,566,942, Apparatus for Peeling Vegetables or Fruit, issued on Mar. 2, 1971, However, the peeler of this prior patent includes rolls forming a complete drum which is rotated as the rolls are turned to tumble and move the produce along. The present invention is simpler in construction.

SUMMARY OF THE INVENTION

A machine for peeling fruits and vegetables comprising a frame supporting a plurality of rolls 14 in a "U" configuration with each roll being individually rotated and including an outer surface for removing peel from produce. A power driven auger is positioned for moving and tumbling the produce along the trough. The tumbling action is aided by the rolls being positioned in a hyperbolic configuration to enhance the movement imparted on the produce. The rolls are individually driven such that the rotating speed of each can be adjusted. Additionally, the rolls are interchangeable while maintaining equal spacing with the auger for effective feeding of the produce through the peeler.

DESCRIPTION OF THE DRAWINGS

FIG. 1 is a side view of a peeler incorporating the subject invention.

FIG. 2 is a view along the line 2—2 of FIG. 1.

DESCRIPTION OF THE PREFERRED EMBODIMENT

Figure 4:
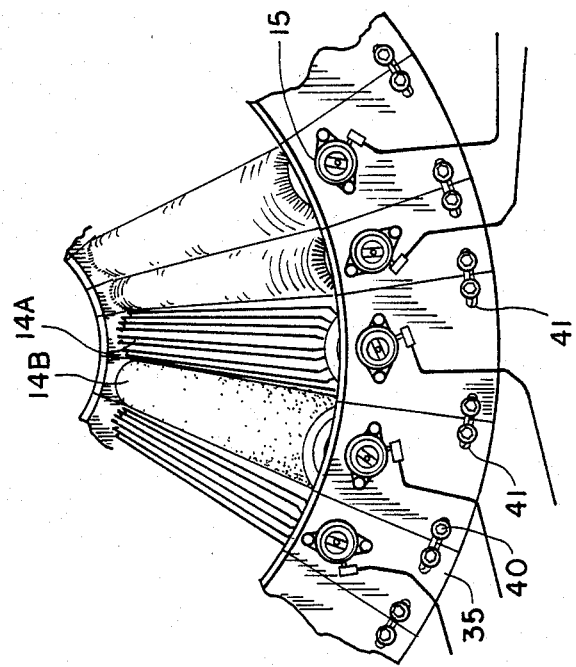
FIG. 4 is an enlarged view of a section of the end plates shown in FIG. 3.

In FIG. 1 the apparatus incorporating the invention is shown supported on a frame comprising the corner positioned legs 10 connected by cross pieces 11. A U-shaped trough 12 is formed of a plurality of rolls 14 each mounted for rotation by a bearing 15 (FIG. 3) and a hydraulic drive motor 16 (FIG. 2). The drive motors are supplied hydraulic fluid through the connecting hoses 17 which lead to a manifold 18 having connected thereto an inlet or supply line 19 and a return line 20. Normally the peeling apparatus shown has side panels attached to the frame; however, these panels are not included so the internal peeler mechanism can be better illustrated.

Produce is fed into an inlet chute 22 and moved through the peeler at a controlled rate by a central positioned auger 26 supported on vertical frame members 27 which are fixed to the top frame members 28. This auger is driven by a hydraulic motor 29 which is supplied hydraulic fluid through the hydraulic lines 30. Peel removed from the produce drops into the trough 32.

In accordance with one feature of the invention the rolls 14 are mounted in a hyperbolic configuration which tends to create a unique tumbling effect for the efficient removal of peel or tags from the produce. As shown in FIG. 1, the axes of rotation of the individual rolls extend non-parallel to the axis of rotation of the auger 26 and the trough 12, thereby reducing the possibility that a product to be peeled will merely ride down the valley between a pair of rolls and not be tumbled into contact with other rolls. The tumbling action reduces the chance of flat spots and shape distortions even with irregularly shaped vegetables. Thus, the product flows more smoothly and consistently through the peeler at a speed that is controlled by the auger. With the produce tumbling more effectively it can be moved through the peeler at a higher speed because exposure to the rollers is increased. Thus, the throughput of the peeler is increased with the hyperbolic positioning of the rollers.

Figure 3:
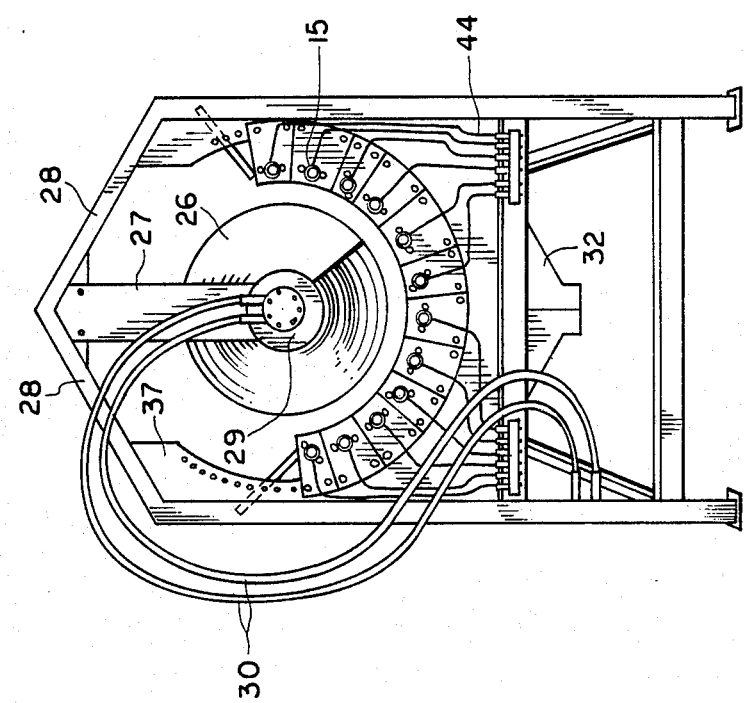
FIG. 3 is a view along the line 3—of FIG. 1.

As shown by FIGS. 1-3 taken in combination, the bearing 15 and hydraulic drive motor 16 connected with opposite ends of each roll 14 are angularly rotated relative to each other so that the individual rolls 14 remain in equal radially spaced but non-parallel relation with the axes of the auger 26 and the trough 12. This relationship is illustrated in combination by FIGS. 1-3 while also being generally shown by the fragmentary view of FIG. 4. FIGS. 1-3, particularly FIG. 3, also illustrates the coaxial arrangement of the auger 26 and the trough 12.

A second feature of the invention allows the rolls to be easily removed and replaced. For this purpose the opposite ends of each roll are supported by bearing plates 35 and 36 which are fixed to the end frame members 37 and 38 respectively. These plates are held by bolts 37 which pass through the elongated openings 41 in the plates and into the end members 37 or 38. For large rolls 14A (FIG. 4) the plates 36 are used because they are wider to accommodate the rolls of greater diameter. The smaller rolls 14B are supported by the narrower plates 35. In order to maintain the rolls equally spaced from the auger for the proper movement of the produce, the rolls 14B are supported by the bearings 15 which are positioned closer to the auger to accommodate the smaller radius. In this manner the rolls can be intermixed for the most effective peel action as determined by requirements of the produce being peeled with each roll being positioned equidistant from said auger regardless of size.

In accordance with another feature of the invention the rolls are driven at speeds which can be individually regulated for each roll. Each of the motors includes a flow control valve 44 to allow the individual adjustment of the motor speed. In this manner as rolls of different diameters are mixed the speed of the drive motor can be adjusted to maintain optimum peripheral speed for the proper peeling effect. The rolls may have varying outer surfaces, and it has been found that different rotational speeds may be better for different roll surfaces, ie. brush, abrading, studs, etc., as well as for different roll diameters. The roll bearings are supplied lubricant through the oil lines 45.

I claim:

1. A peeling machine, comprising a frame;

a plurality of rolls each having a roll surface capable of removing peel from product contacting the rolls;

means for supporting the rolls generally in a "U" configuration to form a trough along which the product can flow; and means for rotating the rolls in order to tumble the product and thereby produce peeling action;

the means for supporting the rolls including means for mounting opposite ends of each of the rolls in circumferentially or angularly offset relation so that the rolls are arranged in a hyperbolic configuration with the roll axes being positioned in non-parallel relation to an axis of the trough for enhancing the peeling action of the machine.

2. The peeling machine of claim 1 further comprising means for adjusting the rotational speed of each roll.

3. The peeling machine of claim 1 further comprising a power driven auger positioned generally coaxially with the trough formed by the rolls.

4. The peeling machine of claim 3 wherein the means for supporting the rolls include means for supporting rolls of different diameters.

5. The peeling machine of claim 4 wherein the means for supporting rolls of different diameters are adapted for maintaining the rolls equidistant from the axis of the auger and trough.

* * * * *